(12) United States Patent
Ludwig et al.

(10) Patent No.: US 8,443,664 B2
(45) Date of Patent: May 21, 2013

(54) EQUALIZING CONTAINER FOR A HYDRAULIC MOTOR VEHICLE BRAKE SYSTEM

(75) Inventors: Johann Ludwig, Steinbach (DE); Hans-Jürgen Neumann, Rüsselsheim (DE); Swen Ottmann, Frankfurt (DE); Christoph Schiel, Bad Nauheim (DE); Peter Tandler, Kronberg (DE); Werner Krebs, Hambach (DE); Barbara Schmidt, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 919 days.

(21) Appl. No.: 12/518,448

(22) PCT Filed: Dec. 11, 2007

(86) PCT No.: PCT/EP2007/063720
§ 371 (c)(1),
(2), (4) Date: Jun. 10, 2009

(87) PCT Pub. No.: WO2008/071708
PCT Pub. Date: Jun. 19, 2008

(65) Prior Publication Data
US 2010/0044163 A1    Feb. 25, 2010

(30) Foreign Application Priority Data

Dec. 13, 2006 (DE) .......................... 10 2006 058 670
Jun. 2, 2007 (DE) .......................... 10 2007 025 826

(51) Int. Cl.
*G01F 23/00* (2006.01)

(52) U.S. Cl.
USPC ............... 73/290 R; 73/305; 73/309; 73/313; 73/314; 73/319; 340/450.1; 340/624; 335/205

(58) Field of Classification Search
USPC ........... 188/1.11 E; 73/305–322.5; 200/84 C; 335/151, 205; 340/450.1, 624
See application file for complete search history.

(56) References Cited

U.S. PATENT DOCUMENTS 4,305,285 A * 12/1981 Kubota et al. ................... 73/308
(Continued)

FOREIGN PATENT DOCUMENTS

DE     35 24 281 A1   1/1987
DE     37 16 135 A1   11/1988
(Continued)

*Primary Examiner* — Hezron E Williams
*Assistant Examiner* — Hoang Nguyen
(74) *Attorney, Agent, or Firm* — RatnerPrestia (57) ABSTRACT

An equalizing tank for a hydraulic motor vehicle brake system, with a housing including a housing upper part and a housing lower part, and with a device for monitoring the fluid level in the equalizing tank, the device including a switching unit which is fastened to the housing and has a plug-in connector and a contact carrier, a portion of which projects into a guide pipe which extends into an interior space of the tank, and a sensor element or switching element which is arranged on the contact carrier in the region of the guide pipe and which can be switched by a transmitter in a switching point at which the switching unit generates a signal for an electronic control unit.

17 Claims, 6 Drawing Sheets

U.S. PATENT DOCUMENTS

| | | | | |
|---|---|---|---|---|
| 4,821,022 A * | 4/1989 | Jannotta | | 340/514 |
| 4,841,107 A | 6/1989 | Tandler et al. | | |
| 4,926,015 A | 5/1990 | Takahashi et al. | | |
| 5,254,815 A * | 10/1993 | Nakano et al. | | 200/84 C |
| 6,363,785 B1 * | 4/2002 | Senghaas et al. | | 73/313 |
| 7,640,742 B2 * | 1/2010 | Tandler et al. | | 60/534 |
| 2006/0283244 A1 | 12/2006 | Schonlau et al. | | |

FOREIGN PATENT DOCUMENTS

| | | |
|---|---|---|
| DE | 102 39 126 A1 | 7/2003 |
| DE | 10 2005 009 657 A1 | 11/2005 |
| GB | 2 178 238 | 2/1987 |
| GB | 2 202 913 A | 10/1988 |
| WO | WO 2005/024414 A2 | 3/2005 |

* cited by examiner

Fig. 14
B - B ered with a device for monitoring the fluid level in the equalizing tank, said device comprising a switching unit which is fastened to the housing and has a plug-in connector and a contact carrier, a portion of which projects into a guide pipe which extends into an interior space of the tank, and a sensor element or switching element which is arranged on the contact carrier in the region of the guide pipe and which can be switched by means of a transmitter in a switching point at which the switching unit generates a signal for an electronic control unit.

EQUALIZING CONTAINER FOR A HYDRAULIC MOTOR VEHICLE BRAKE SYSTEM

CROSS REFERENCE TO RELATED APPLICATIONS

This application is the U.S. national phase application of PCT International Application No. PCT/EP2007/063720, filed Dec. 11, 2007, which claims priority to German Patent Application No. DE 10 2006 058 670.0, filed Dec. 13, 2006 and German Patent Application No. DE 10 2007 025 826.9, filed Jun. 2, 2007, the contents of such applications being incorporated by reference herein.

BACKGROUND OF THE INVENTION

1. Field of the Invention

The invention relates to an equalizing tank (i.e., container) for a hydraulic motor vehicle brake system, with a housing comprising a housing upper part and a housing lower part, and with a device for monitoring the fluid level in the equalizing tank, said device comprising a switching unit which is fastened to the housing and has a plug-in connector and a contact carrier, a portion of which projects into a guide pipe which extends into an interior space of the tank, and a sensor element or switching element which is arranged on the contact carrier in the region of the guide pipe and which can be switched by means of a transmitter in a switching point at which the switching unit generates a signal for an electronic control unit.

2. Description of the Related Art

In a hydraulic motor vehicle brake system, the brake fluid required is located in the equalizing tank, with the device for monitoring the fluid level in the tank having, for example, a reed switch with a reed contact as the switching element and, for example, a magnetic transmitter as the transmitter. If the brake fluid level drops and the magnetic transmitter passes the switching point, the switching contacts of the reed switch close. This signal is evaluated in a control device and the driver of the motor vehicle can be warned by an optical and/or acoustic indication. In this case, it has to be ensured that the equalizing tank is always filled with a minimum of brake fluid in order not to jeopardize the operation of the brake system. As a rule, in order to monitor the fluid level in the tank, use is made of devices in which a float provided with a magnet switches the reed contact as soon as the float takes up a position (switching point) in which the fluid level in the tank falls below a defined minimum. A warning signal which can be perceived by the driver is triggered by the reed contact, whereupon suitable countermeasures can then be introduced.

An equalizing tank of the type in question is known, for example, from DE 37 16 135 A1 or DE 35 24 281 A1. A tab is fastened to the contact carrier of the known equalizing tank, said tab extending parallel to the longitudinal axis of the guide pipe and projecting into an inner slot of a radial projection of the guide pipe in order to be fastened in a predetermined position to projections of the guide pipe. The plug-in connector of the switching unit is provided in a plug-in connector housing which is welded to a side wall protruding from the housing upper part. This firstly requires extremely complicated installation. Secondly, the switching unit is not exchangeable as a result, and therefore, in the event of a defect, the entire equalizing tank has to be exchanged.

There are further disadvantages with regard to packaging and transportation of the known equalizing tank, since the switching unit protrudes from the upper side of the equalizing tank.

SUMMARY OF THE INVENTION

It is an object of the invention to provide an equalizing tank which is improved with regard to installation and costs, switching behavior and exchangeability of the switching unit.

This object is achieved according to aspects of the invention in that the contact carrier has a pot-shaped portion which interacts with a complementary portion formed on the housing in order to permit a releasable connection of the switching unit to the housing, with that portion of the contact carrier which carries the sensor element or switching element extending centrally from a base of the pot-shaped portion, and a housing of the plug-in connector being arranged on the contact carrier perpendicularly with respect to a longitudinal axis of the switching unit. As a result the switching unit can be fitted simply and rapidly on the housing of the equalizing tank, and complicated installation steps can be dispensed with. Furthermore, the releasable connection of the pot-shaped portion of the contact carrier and of the complementary portion of the housing permits precise positioning of the sensor element or switching element and therefore exact positioning of the switching point.

Separate installation of the plug-in connector onto the equalizing tank can be dispensed with by the housing of the plug-in connector being molded onto a wall of the pot-shaped portion.

The complementary portion formed on the housing is preferably designed as an annular projection, within which the guide pipe is provided, the guide pipe and the annular projection being arranged concentrically. This can substantially simplify the installation of the switching unit.

An embodiment of the invention which is particularly optimized with regard to packaging provides that the annular projection is arranged in a region of the housing, which region is provided offset in the direction of the interior space of the tank in comparison to the rest of the region of the housing. The switching unit therefore does not protrude over the housing and cannot get in the way either during transportation or in the fitted state of the equalizing tank.

The releasable connection of the contact carrier to the complementary portion is preferably configured as a bayonet connection which comprises two diametrically opposite apertures with undercuts on an inner side of the pot-shaped portion and two diametrically opposite ribs on an outer side of the annular projection. This connection permits simple exchangeability of the switching unit without the necessity of using tools.

The annular projection is preferably of resilient design, and an edge of the annular projection bears in a sealing manner against the inner side of the pot-shaped portion. This design of the annular projection brings about a dual function of the projection, since the projection firstly protects an interior space of the guide pipe against an ingress of spray water and secondly presses the apertures against the ribs of the bayonet connection. In this case, the undercuts prevent inadvertent detachment of the switching unit.

In order to reinforce the equalizing tank in the region of the annular projection, reinforcing ribs are preferably provided between the annular projection and the guide pipe.

The switching unit can be produced in a simple manner by the contact carrier being formed together with the plug-in connector as a single part made of plastic. For this purpose, according to an advantageous embodiment of the invention, the contact tabs are provided injected into the contact carrier.

A cost-effective embodiment of the invention provides that the sensor element or switching element is a reed switch.

According to advantageous embodiments, the reed switch can be fastened to contact tabs and can be accommodated in a recess of the contact carrier, or the reed switch is fastened to a printed circuit board which is arranged on the contact carrier.

The reed switch can be protected in particular during transportation by the reed switch being provided embedded into the material of the contact carrier.

As an alternative, the printed circuit board and a part of the contact carrier can be surrounded by a tubular casing, the flange of which is welded to the contact carrier in the region of the base of the pot-shaped portion. The casing can be produced in a simple manner and can be fastened to the contact carrier without much difficulty.

A further advantageous embodiment of the invention provides that means for avoiding erroneous installation of the switching unit are provided. As a result, erroneous installation of the switching unit and resultant damage of the components can be ruled out.

The means are preferably provided as a recess in the housing and as a rib on the switching unit, the recess being arranged in the region of the guide pipe (83) and the rib extending from the base of the pot-shaped portion along the contact carrier. It can thus be ruled out, for example, that a switching unit which is screwed in clockwise is fitted into a housing which is designed for a switching unit rotating counterclockwise. Furthermore, installation of the switching unit in a wrong position can be avoided.

Further features, advantages and possibilities of using the invention emerge from the description below of exemplary embodiments and with reference to the drawing which shows embodiments. In this case, in each case in highly schematized form and partially in section:

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
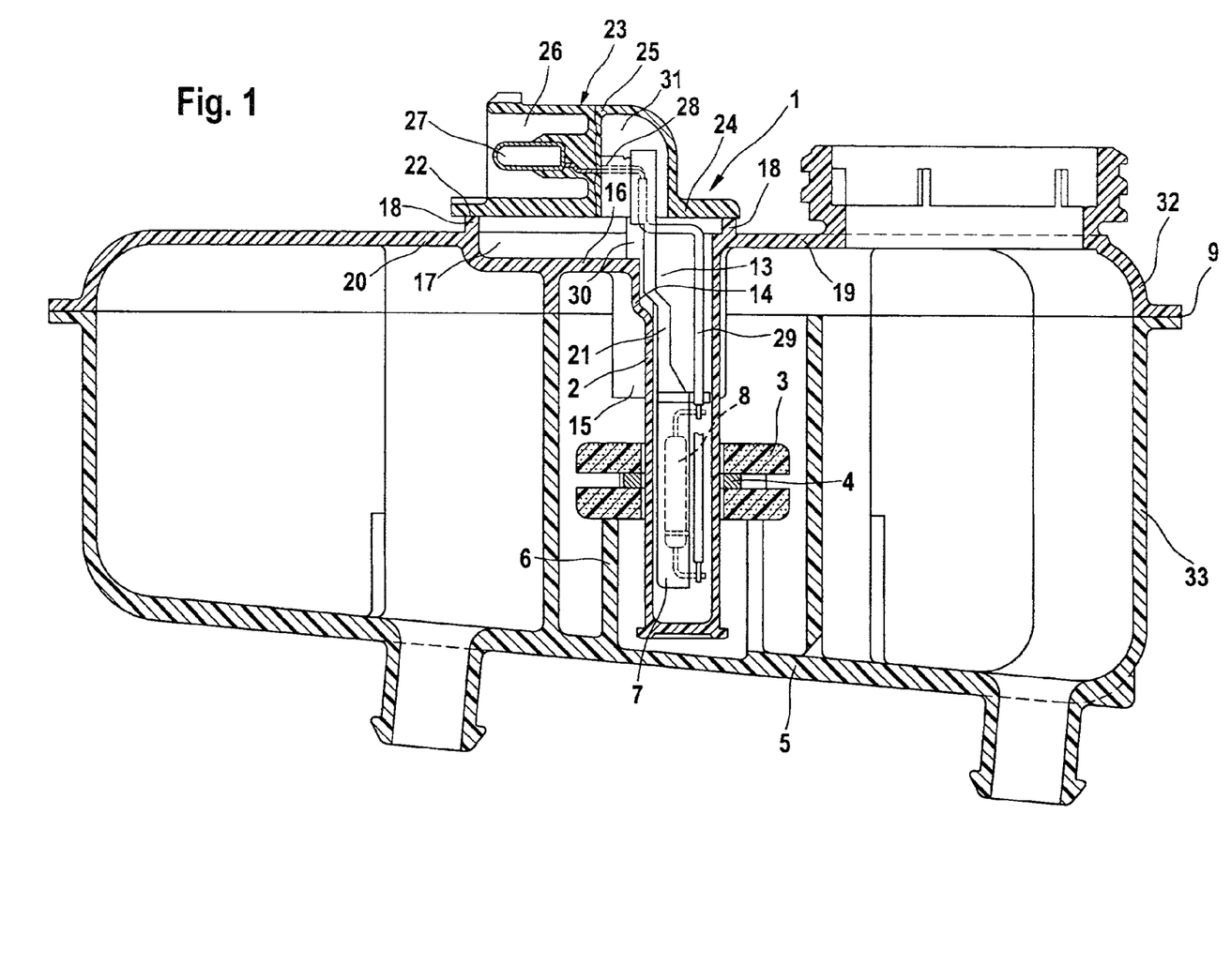
FIG. 1 shows a longitudinal section of a known equalizing tank.

FIG. 1 shows a known equalizing tank 1 for brake fluid according to DE 37 16 135 A1 with a device for monitoring the fluid level of the tank. The equalizing tank 1 is fastened, for example, to a main cylinder (not illustrated) of a vehicle brake system and has a guide pipe 2 which projects into the interior of said tank and is closed at its end facing the interior of the tank. A float 3 which is designed, for example, as a ring and constitutes a part of a device for monitoring the fluid level of the tank is arranged displaceably along the guide pipe 2, which has, for example, a circular cross section. The float 3 carries an annular magnet 4 as a magnetic transmitter. A connecting pipe 6, which protrudes from the base 5 of the equalizing tank 1 and concentrically surrounds part of the guide pipe 2, is provided as a stop for the float 3. Said stop defines the lowermost position of the float 3 in the equalizing tank 1 and prevents the float 3 from being able to leave the guide pipe 2. Known measures for securing the float also include expanding elements arranged at the end of the guide pipe 2.

The device for monitoring the fluid level of the tank comprises a switching unit with a cover 23 and a contact carrier 7 which is provided in the interior of the guide pipe 2 and to which a reed switch 8 is fastened as a switching element. As soon as the magnet 4 passes a switching point S of the switching element by the fluid level of the tank dropping, the reed contact of the reed switch 8 closes or opens and a signal for an electronic switching unit of the motor vehicle brake system is generated. A tab 21 is fastened to the contact carrier 7, said tab extending parallel to the longitudinal axis of the guide pipe 2 and projecting into an inner slot 13 of a radial projection 14 of the guide pipe 2. The guide pipe 2 is provided with a plurality of ribs 15 which are arranged offset symmetrically in relation to one another on the surface of said guide pipe and form the upper stop for the float 3.

At its upper end, the guide pipe 2 merges into a base 16 of a flat cavity 17, the side walls 18 of which are connected to walls 19 and 20 of the equalizing tank 1. The side walls 18 protrude by a small amount over the walls 19, 20 of the equalizing tank 1, and, by means of their upper edges 22, form stop surfaces for the cover 23 which contains a planar baseplate 24 from which protrudes a plug-in connector housing 25 which is provided welded to the side walls 18. The plug-in connector housing 25 is provided with a recess 26 into which two contact pins 27 or blade contacts of a plug-in connector project, said plug-in connector being inserted at one end into the plug-in connector housing 25 in a gastight and liquid tight manner. That end 28 of each contact pin 27 which is opposite the recess 26 is connected to the end of an electric line 29. The other ends of the electric lines 29 are joined to the reed switch 8.

Two projections 30 which continue the walls for a distance on mutually opposite sides of the slot 13 and, for example, are not higher than the side walls 18 project into the cavity 17. The tab 21 extends in the space between the projections 30 and is connected to the latter by means of suitable methods (for example adhesive bonding, welding, screwing on or pressing on). A recess 31 is provided in that part of the plug-in connector housing 25 which is located above the projections 30, into which recess the end of the tab 21 and, if appropriate, the projections 30 can project when the cover 23 closes the cavity 17. The equalizing tank 1 comprises a housing comprising a housing upper part 32 and a housing lower part 33 which are welded to each other at their edges 9.

The float 3 of the device for monitoring the fluid level of the tank is provided as a single piece and has a radial cutout into which the annular magnet 4 is pushed. Side walls of the cutout are provided here with retaining means which secure the magnet 4 in its fitted position.

FIGS. 2 to 8 show various views of details and components of a first exemplary embodiment of an equalizing tank 40 according to aspects of the invention. Since the equalizing tank 40 according to aspects of the invention differs from the known equalizing tank according to FIG. 1 only in terms of its switching unit 41 and arrangement thereof on the housing, only those parts of the equalizing tank 40 which may be essential to the invention and which are described below are illustrated. Identical components are provided with identical designations and a repeated description is omitted.

Figure 2:
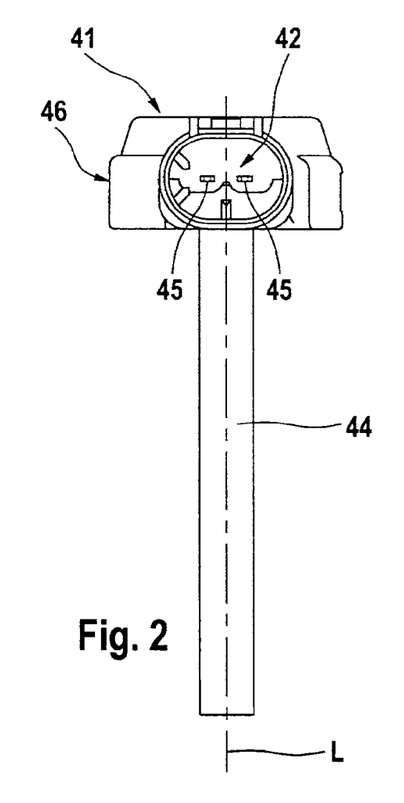
FIG. 2 shows a front view of a switching unit of a first exemplary embodiment of an equalizing tank according to aspects of the invention.
Figures 3, 4:
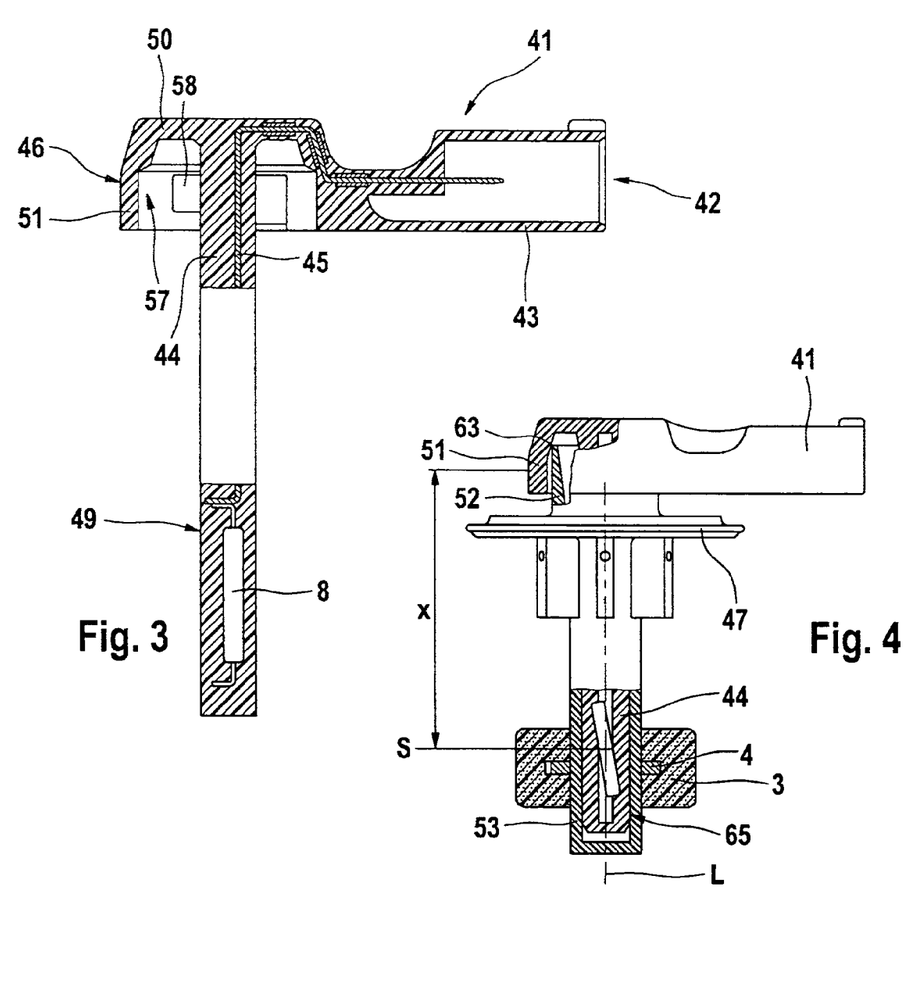
FIG. 3 shows a side view, partially sectioned, of the switching unit according to FIG. 2.
FIG. 4 shows, partially sectioned, a detail of the equalizing tank according to aspects of the invention from FIG. 2.

FIGS. 2 and 3 show a front and side view of a switching unit 41 of the equaling tank 40, with FIG. 3 being illustrated partially sectioned.

The switching unit 41 comprises a plug-in connector 42 with a housing 43 and a contact carrier 44 and, in order to facilitate the installation and to simplify the production of the switching unit 41, is formed as a single part from a plastics material. Contact tabs 45, to which the reed switch 8 is fastened as a switching element, and other components, such as, for example, resistors, are injected into the contact carrier 44.

The reed switch 8 as the switching element constitutes a cost-effective variant of the sensor element or switching element, but can also be replaced by a different sensor element or switching element.

Figure 8:
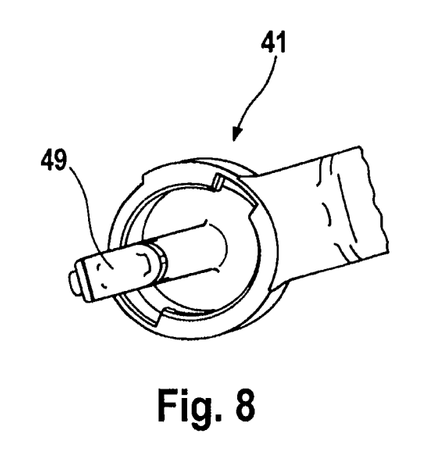
FIG. 8 shows a three-dimensional illustration of the switching unit according to FIGS. 2 and 3.

FIG. 3 shows the arrangement of the reed switch 8 merely schematically. It is thus conceivable, as shown in FIG. 8, to arrange the reed switch 8 in a recess of the contact carrier 44 and to fasten it therein by means of the contact tabs 45. In order to protect the reed switch 8, the latter can be embedded into the material of the contact carrier 44, as illustrated in FIG. 3. For this purpose, the contact carrier 44 can be encapsulated, for example in the region of the reed switch 8, by the same material by injection molding, or a portion 49 of the contact carrier 44, which portion projects into a guide pipe 53 of the equalizing tank 40, can be encased after fastening of the reed switch 8.

In order to permit a releasable connection of the switching unit 41 to a housing 47 of the equalizing tank 40, the contact carrier 44 has a pot-shaped portion 46 which interacts with a complementary portion 48 formed on the housing 47. As can be gathered in particular from FIG. 3, that portion 49 of the contact carrier 44 which carries the reed switch 8 extends centrally from a base 50 of the pot-shaped portion 46, and the housing 43 of the plug-in connector 42 is arranged on the contact carrier 44 perpendicularly with respect to a longitudinal axis L of the switching unit 41.

In this case, separate installation of the plug-in connector 42 onto the equalizing tank 40 can be dispensed with by the housing 43 of the plug-in connector 42 being molded onto a wall 51 of the pot-shaped portion 46.

Figures 5, 6:
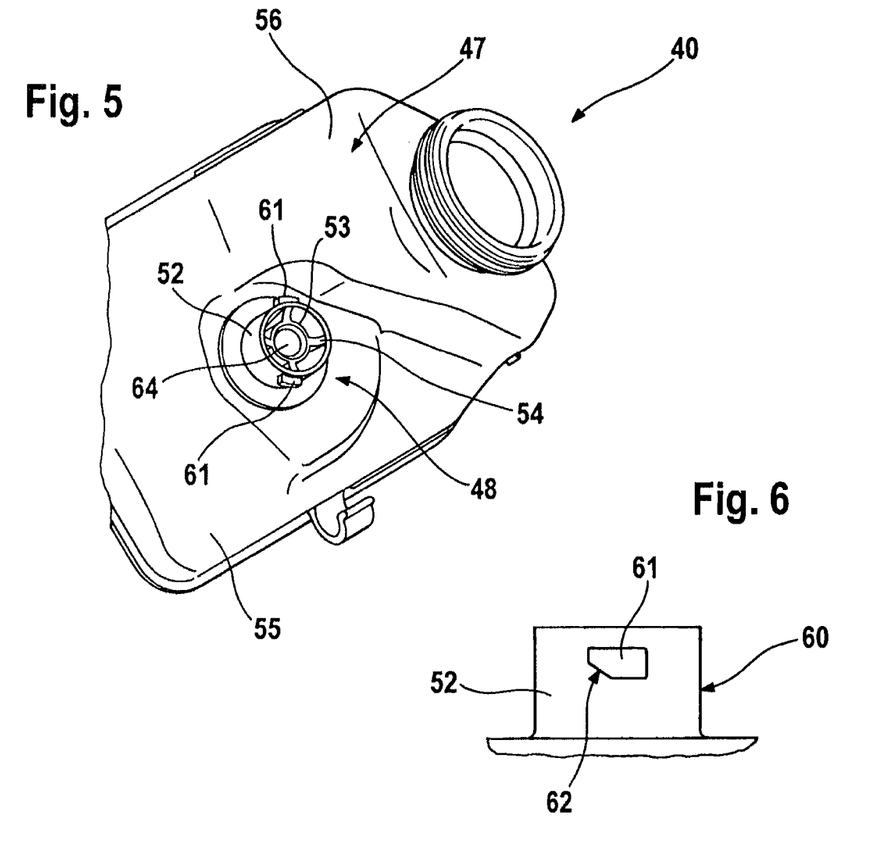
FIG. 5 shows a three-dimensional illustration of the equalizing tank according to aspects of the invention from FIG. 2.
FIG. 6 shows a detail of the equalizing tank according to aspects of the invention from FIG. 2.
Figure 7:
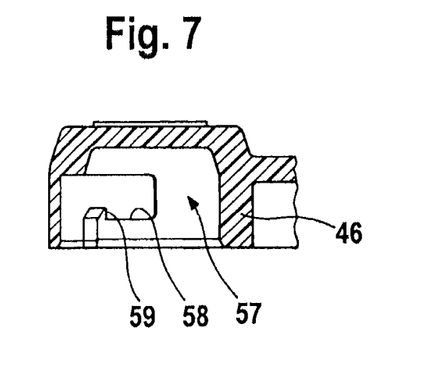
FIG. 7 shows, in section, a detail of the switching unit according to FIGS. 2 and 3.

FIG. 4 shows the partially sectioned switching unit 41 after installation into the housing 47 of the equalizing tank 40 which is illustrated three-dimensionally in FIG. 5. As is apparent, the complementary portion 48 is designed as an annular projection 52, within which the guide pipe 53 is provided. The guide pipe 53 and the annular projection 52 are arranged concentrically, with reinforcing ribs 54 being provided between the annular projection 52 and the guide pipe 53 in order to reinforce the equalizing tank 40 in the region of the annular projection 52.

Further stabilization of the switching unit 41 is ensured via a fit 65 in the inner region of the guide pipe 53—namely between the section 49 of the contact carrier 44 and an inner side of the guide pipe 53.

In order to optimize the packaging of the equalizing tank 40, the annular projection 52 is arranged in a region 55 of the housing 47, which region is provided offset in the direction of the interior space of the tank in comparison to the rest of the region 56 of the housing 47. The switching unit 41 therefore does not protrude over the housing 47 and cannot get in the way either during transportation or in the fitted state of the equalizing tank 40. Furthermore, it can be avoided by means of the housing geometry shown that the switching unit 41 is installed in a wrong position—for example rotated through 180° with respect to the longitudinal axis L.

The releasable connection of the contact carrier 44 to the complementary portion 48 is configured as a bayonet connection which comprises two diametrically opposite apertures 58 with undercuts 59 on an inner side 57 of the pot-shaped portion 46 and two diametrically opposite ribs 61 on an outer side 60 of the annular projection 52. Said connection permits simple exchangeability of the switching unit 41 without the use of a tool, with the undercuts 59 preventing inadvertent release of the connection. In this case, it is possible also to provide different latching connections, such as, for example, a snap-in connection with resilient snap-in elements and corresponding elements for the snap-in elements to snap into.

FIG. 6 shows the annular projection 52 in the form of a detail. As is apparent, the ribs 61 have a substantially rectangular shape, with an oblique surface 62 being provided at one corner, said surface interacting with the undercut 59 and permitting the rib 61 to be inserted into the aperture 58.

The annular projection 52 is of resilient design, and an edge 63 of the annular projection 52 bears in a sealing manner against the inner side 57 of the pot-shaped portion 46. By this means, the annular projection 52 obtains a dual function, since the projection 52 firstly protects an interior space 64 of the guide pipe 53 against an ingress of spray water and secondly presses the apertures 58 against the ribs 61 of the bayonet connection. By means of the shown configuration of the ribs 61 and of the apertures 58, the screwing-in direction of the switching unit 41 is defined and takes place clockwise until the bayonet connection latches in place. In the case of a mirror-inverted configuration, the screwing-in takes place counterclockwise.

The switching unit 41 is removed by pressing the switching unit 41 against the edge 63 of the annular projection 52 and rotating it counterclockwise until the bayonet connection is released.

Figure 9:
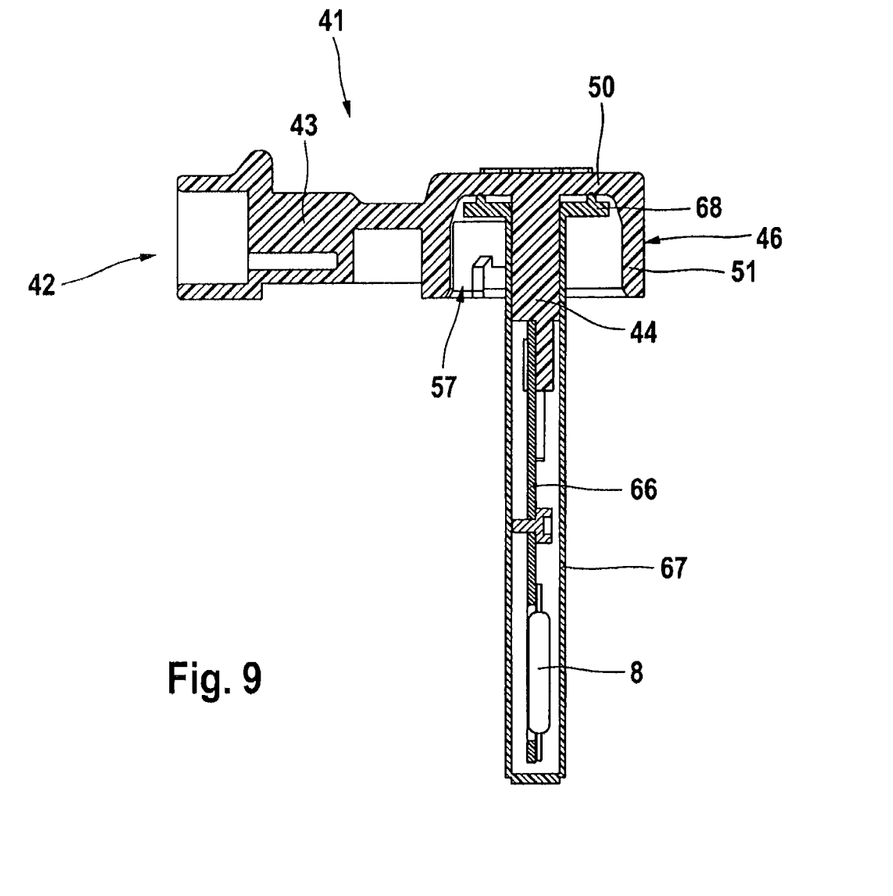
FIG. 9 shows, in section, an alternative embodiment of a switching unit of a second exemplary embodiment of an equalizing tank according to aspects of the invention.

FIG. 9 shows an alternative fastening of the reed switch 8 by way of a second exemplary embodiment of an equalizing tank 40. This envisages arranging the reed switch 8 on a printed circuit board 66 which is provided fastened to the contact carrier 44. The printed circuit board 66 and a part of the contact carrier 44 are surrounded for protection by a tubular casing 67 which is welded to the contact carrier 44 by a flange 68 in the region of the base 50 of the pot-shaped portion 46. An end of the case, which end points in the direction of the interior space of the tank, is provided closed, and, in this embodiment of the switching unit 41, the casing 28 projects into the guide pipe 53.

A third exemplary embodiment of an equalizing tank 70 according to aspects of the invention can be gathered from FIGS. 10 to 14. The operation and the basic construction correspond to the operation and construction of the first exemplary embodiment, and therefore reference is expressly made to the above description of the first exemplary embodiment, with the designations having each been increased by 30.

Figures 10, 11, 12:
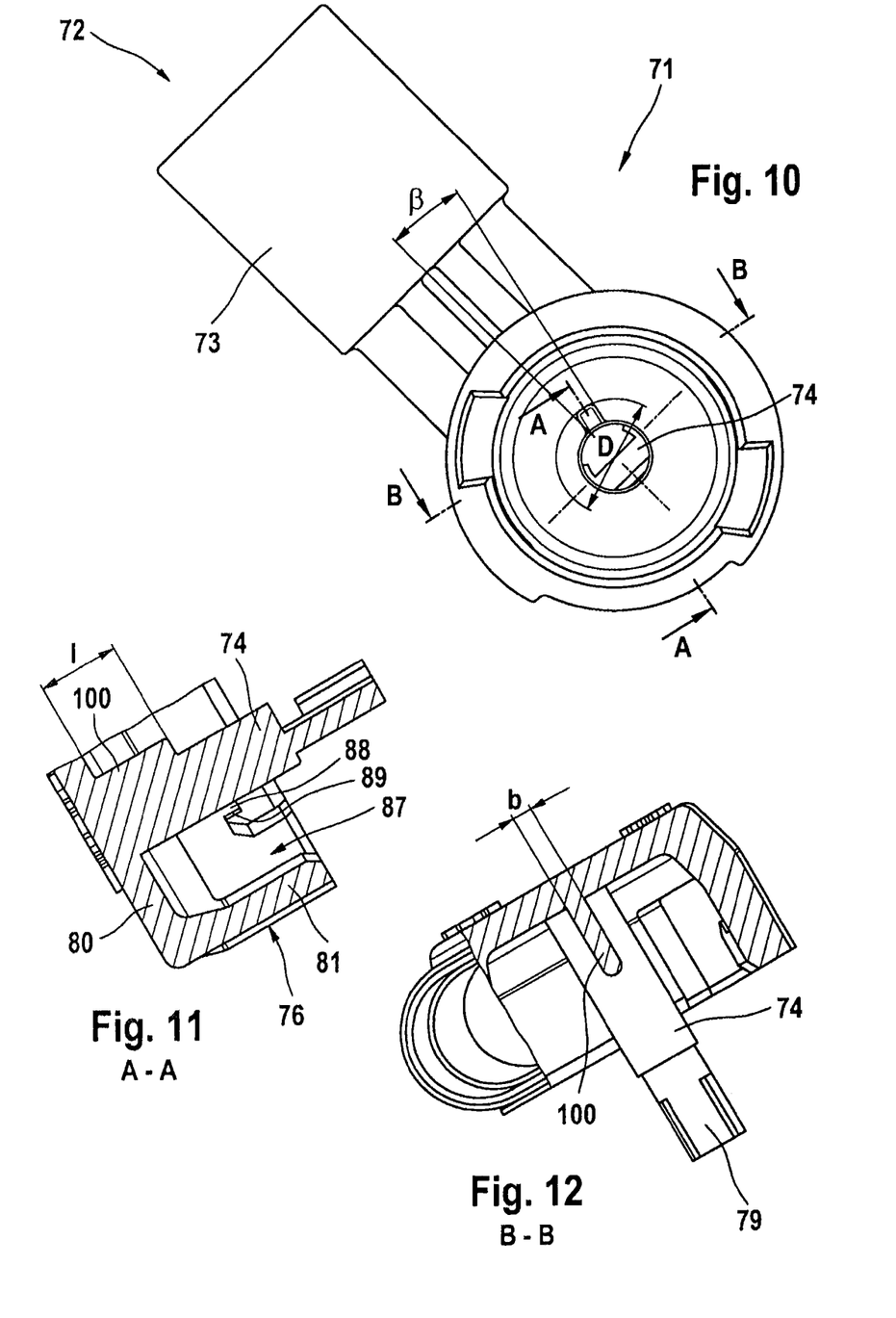
FIG. 10 shows a front view of a switching unit of a third exemplary embodiment of an equalizing tank according to aspects of the invention.
FIG. 11 shows the switching unit according to FIG. 10 in the section along the line A-A.
FIG. 12 shows the switching unit according to FIG. 10 in the section along the line B-B.

The third exemplary embodiment has advantageous means for avoiding erroneous installation of a switching unit 71 into a housing 73 of the equalizing tank 70, which means can be gathered from FIGS. 10 to 12.

Figure 13:
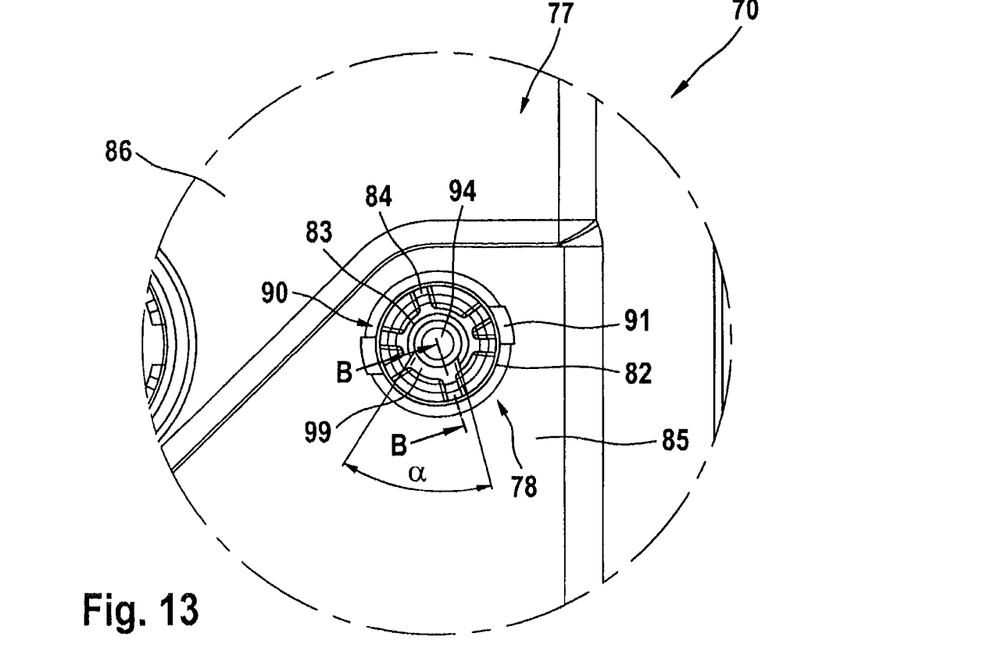
FIG. 13 shows a detail of the third exemplary embodiment of an equalizing tank according to aspects of the invention.
Figure 14:
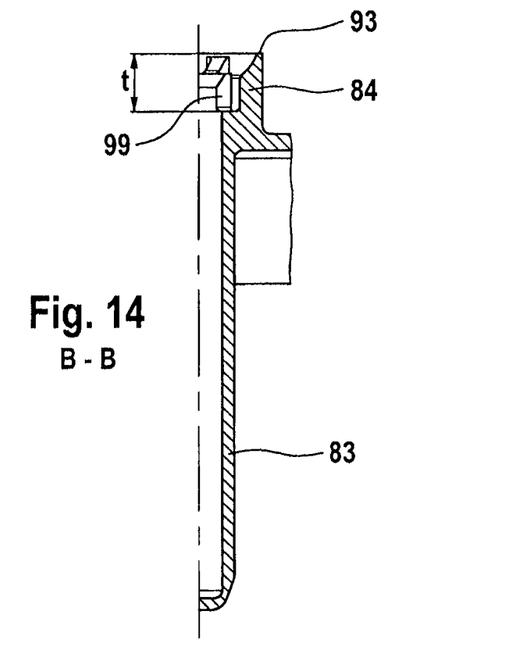
FIG. 14 shows, in section, a detail of the equalizing tank according to aspects of the invention from FIG. 13.

FIGS. 13 and 14 each show a detail of the housing 77 of the equalizing tank 70. In order to avoid erroneous installation of the switching unit 71, a recess 99 which extends over an angle $\alpha$ and has a depth t is provided in the region between two reinforcing ribs 84 between a projection 82 and a guide pipe 83 of the housing 77.

As a complementary element to the recess 99, the switching unit 77 has a rib 100 which extends with a length I along a contact carrier 74 from the base 80 of a pot-shaped portion 76 of the switching unit 71. Furthermore, the rib 100 is defined by a diameter D, a width b and a position angle $\beta$, as clearly revealed in the individual illustrations according to FIGS. 10 to 12.

During the installation, the switching unit 71 is introduced together with the rib 100 into the recess 99 and, as described for the first exemplary embodiment, is latched in place by means of ribs 91 and apertures 88 by rotating counterclockwise or clockwise.

The length I and the diameter D of the rib 100 are matched here to the depth t and to a radial extent of the recess 99. Furthermore, the angle $\alpha$ of the recess 99 permits the necessary rotation of the switching unit 71 until the ribs 91 latch into the apertures 88.

In addition, the modular dimension x can be selected in such a manner that the switching point S varies in different modular dimensions x such that a switching test proceeds negatively if a switching unit 41, 71 having the wrong modular dimension x has been fitted. This results in a possibility of avoiding installation of a switching unit 41, 71 with a wrong modular dimension x.

It is also conceivable within the context of the invention to provide the described means for avoiding erroneous installation of a switching unit, i.e. recess 99 and rib 100, in the second exemplary embodiment described according to FIG. 9. In contrast to the third exemplary embodiment, the rib 100 has to be arranged on the sleeve 67. In this case, the correct positioning of the sleeve 67 on the switching unit is to be ensured.

The equalizing tank 40, 70 according to aspects of the invention permits simple and rapid installation of the switching unit 41, 71 on the housing 47, 77 of the equalizing tank 40, 70, thus making it possible to dispense with complicated installation steps. The switching unit 41, 71 can be installed either in the housing upper part or in the housing lower part of the equalizing tank 40, 70.

Furthermore, the releasable connection of the pot-shaped portion 52, 82 of the contact carrier 44, 74 and of the complementary portion 48, 78 of the housing 47, 77 permits precise positioning of the sensor element or switching element 8 and therefore exact positioning of the switching point S.

Further Advantages of the Invention:

By means of the use of a ring magnet 4 which is homogeneous with respect to the magnetic field, a more precise switching behavior is obtained, since flat magnets, by contrast, do not have a homogeneous magnetic field.

A cost-effective reed switch 8 with open contacts can also be used as an OPENER—switching principle without design changes relating to the packaging being made to the equalizing tank 40, 70. If a switching unit is inserted horizontally, either an expensive reed switch with normally closed contacts has to be used, or the switching unit has to be inserted at the top, instead of at the bottom, of the tank.

Greatly differing variants require only a standard float 3 with standard ring magnet 4.

The multiplicity of variants is obtained by modular dimensions x and variable fitted positions in the equalizing tank 40, 70.

By means of appropriate exchangeable inserts in the mold, different geometries of the plug-in connectors 42, 72 and of the contact tabs 45 can be realized.

There is a substantial packaging advantage in the vehicle in relation to a horizontally inserted switching unit.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An equalizing tank for a hydraulic motor vehicle brake system comprising:
  a housing including a housing upper part and a housing lower part, and a guide pipe fixed thereto, the guide pipe extending into an interior space of the housing,
  a float positioned surrounding the guide pipe, and
  a device for monitoring the fluid level in the equalizing tank, said device comprising:
    a switching unit that is fastened to the housing and includes a plug-in connector and a contact carrier, wherein a portion of the contact carrier projects into the guide pipe, and
    a sensor element or switching element which is arranged on the contact carrier in the region of the guide pipe and which can be switched by a transmitter in a switching point upon which the switching unit generates a signal for an electronic control unit,
  wherein the contact carrier includes a pot-shaped portion which interacts with a complementary portion formed on the housing in order to permit a releasable connection of the switching unit to the housing, the switching unit releasable from the housing such that the contact carrier is removable from the guide pipe without removal of the float from the housing, and
  wherein the pot-shaped portion of the contact carrier which bears the sensor element or switching element extends centrally from a base of the pot-shaped portion, and a housing of the plug-in connector is oriented substantially perpendicular with respect to a longitudinal axis of the contact carrier of the switching unit.

2. The equalizing tank as claimed in claim 1, wherein the housing of the plug-in connector is molded onto a wall of the pot-shaped portion.

3. The equalizing tank as claimed in claim 1, wherein the complementary portion formed on the housing is embodied as an annular projection within which the guide pipe is provided, wherein the guide pipe and the annular projection are arranged concentrically.

4. The equalizing tank as claimed in claim 3, wherein the annular projection is arranged in a region of the housing that is offset in a direction of the interior space of the tank with respect to the rest of the housing.

5. The equalizing tank as claimed in claim 3, wherein the releasable connection of the contact carrier to the complementary portion is embodied as a bayonet connection which comprises two diametrically opposite apertures with undercuts on an inner side of the pot-shaped portion and two diametrically opposite ribs on an outer side of the annular projection.

6. The equalizing tank as claimed in claim 3, wherein the annular projection is composed at least partially of a resilient material.

7. The equalizing tank as claimed in claim 6, wherein an edge of the annular projection bears in a sealing manner against the inner side of the pot-shaped portion.

8. The equalizing tank as claimed in claim 3, wherein reinforcing ribs are provided between the annular projection and the guide pipe.

9. The equalizing tank as claimed in claim 3, wherein the contact carrier is formed together with the plug-in connector as a single part composed of plastic.

10. The equalizing tank as claimed in claim 9, wherein contact tabs are positioned within the contact carrier.

11. The equalizing tank as claimed in claim 1, wherein the sensor element or switching element is a reed switch.

12. The equalizing tank as claimed in claim 11, wherein contact tabs are positioned within the contact carrier, and wherein the reed switch is fastened to contact tabs and is accommodated in a recess of the contact carrier.

13. The equalizing tank as claimed in claim 11, wherein the reed switch is fastened to a printed circuit board which is arranged on the contact carrier.

14. The equalizing tank as claimed in claim 12, wherein the reed switch is embedded within the contact carrier.

15. The equalizing tank as claimed in claim 13, wherein the printed circuit board and a part of the contact carrier are surrounded by a tubular casing, wherein a flange of contract casing is coupled to the contact carrier in a region of the base of the pot-shaped portion.

16. The equalizing tank as claimed in claim 1 further comprising means for avoiding erroneous installation of the switching unit.

17. The equalizing tank as claimed in claim 16, wherein the means for avoiding erroneous installation are provided as a recess in the housing and as a rib on the switching unit, the recess being arranged in the region of the guide pipe and the rib extending from the base of the pot-shaped portion along the contact carrier.

* * * * *